United States Patent

Machin, Jr. et al.

[15] 3,651,388
[45] Mar. 21, 1972

[54] DYNAMIC BRAKING CONTROL SYSTEM FOR PLURAL TRACTION MOTORS

[72] Inventors: Charles M. Machin, Jr., Ellicott, Md.; John E. Fawcett, Huntington, W. Va.

[73] Assignees: The Chesapeake and Ohio Railway Company, Cleveland, Ohio; The Baltimore and Ohio Railroad Company, Baltimore, Md.

[22] Filed: Apr. 17, 1970

[21] Appl. No.: 29,627

[52] U.S. Cl. .................................. 318/88, 318/99, 318/375
[51] Int. Cl. ........................................................ H02p 3/14
[58] Field of Search ................... 318/86, 87, 88, 98, 99, 367, 318/375, 317; 317/31

[56] References Cited

UNITED STATES PATENTS 3,305,712   2/1967   Hoffman ............................ 318/87 X
3,373,331   3/1968   Dow .................................. 318/317 X
3,435,293   3/1969   Bodge ................................. 317/31

Primary Examiner—Lewis H. Myers
Assistant Examiner—H. Huberfeld
Attorney—Cushman, Darby & Cushman

[57] ABSTRACT

A control system for controlling the condition of a plurality of electric motors in a single unit or a plurality of electrically powered units connected together for multiple unit operation whereby the units are enabled to operate uniformly. Where the system is adapted for use as a dynamic braking control system for controlling the dynamic braking of a plurality of electric traction motors in a plurality of electrically powered vehicles connected together for multiple vehicle operation, the system enables the percent of maximum braking which occurs in each vehicle to be equal so that each vehicle exerts the same percentage braking effort with respect to ever other vehicle in the multiple vehicle arrangement.

11 Claims, 1 Drawing Figure

PATENTED MAR 21 1972
3,651,388
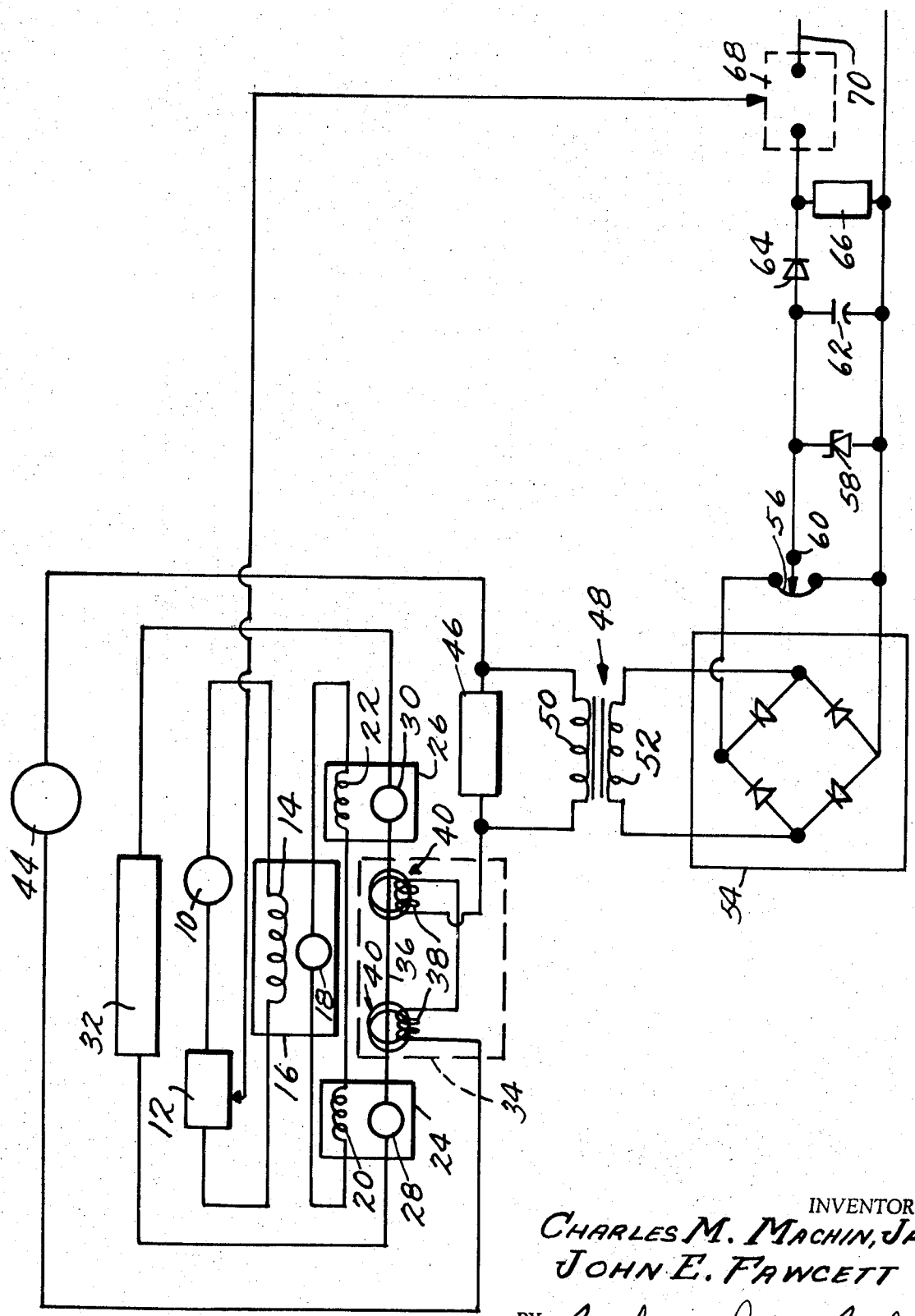
INVENTORS
CHARLES M. MACHIN, JR
JOHN E. FAWCETT
BY Cushman, Darby & Cushman
ATTORNEYS

DYNAMIC BRAKING CONTROL SYSTEM FOR PLURAL TRACTION MOTORS

The present invention relates to control systems for coordinating multiple unit operation and more particularly to a control system for controlling the condition of a plurality of electric motors in a plurality of electrically powered units connected together for multiple unit operation. This invention is subject to a wide range of applications wherein the regulation of the condition, energization or excitation of a plurality of electric motors is desired. One application of this invention is in the braking control of a plurality of electric traction motors in a plurality of electrically powered locomotives which are connected together in a consist whereby each locomotive is caused to exert the same braking percentage of maximum effort with respect to each of the other locomotives in the consist so that smooth braking control of the consist is possible without the adverse effects of rough train handling, possible breaks, derailment, or damage to lading which has heretofore resulted where different locomotives in a consist have exerted different braking efforts.

Many control arrangements are known for controlling the braking of electric traction motors in locomotives, but none of these systems enables locomotives of different characteristics and/or of different manufacturers to be used together in a consist in such a way that they operate in a compatible manner with one another whereby each of the locomotives exerts the same braking effort with respect to the other locomotive at all times during braking operations. The resulting incompatability between the individual locomotives in the same grouping has resulted in extremely wide variations in braking currents within respective locomotive units, rough train handling, breaks, derailments, and damage to lading because one locomotive unit may be exerting maximum braking effort and the one adjacent may be offering minimum braking effort.

Accordingly, the general purpose of this invention is to provide a control system for controlling the conditions of a plurality of electric motors in a plurality of electrically powered units connected together for multiple unit operation whereby the condition of the motors in each of the units is uniformly controlled. In addition to uniformly controlling the percentage of maximum braking current which passes through the armatures of traction motors in electrically powered vehicles the invention has wide application to the uniform control of the speed of a plurality of electric motors in a plurality of electrically powered units and also has application to the control of power applied to such motors.

Still another example of the application of this invention is the ability to determine when maximum energization conditions are present in such a plurality of electric motors so as to avoid exceeding maximum predetermined limits. The present invention contemplates a unique current sensing reactor arrangement with respect to the armatures of the electric motors and with respect to a current-to-voltage converter which is operative with a potentiometer or similar control device so that the voltage output of the potentiometer can be adjusted with respect to the armature current through the electric motors in such a way that the ratio thereof can be controlled.

Therefore, an object of the present invention is the provision of a control system for uniformly controlling the condition of a plurality of electric motors.

Another object is to provide a control system for controlling the condition of a plurality of electric motors in a plurality of electrically powered units connected together for multiple unit operation.

A further object of the invention is the provision of a dynamic braking control system for controlling the dynamic braking of a plurality of electrically powered locomotives so as to avoid rough train handling, derailments, or damage to lading.

Other objects and features of the invention will become apparent to those of ordinary skill in the art as the disclosure is made in the following description of a preferred embodiment of the invention as illustrated in the accompanying drawing in which:

The FIGURE is a diagrammatic representation of a preferred embodiment of the invention.

With reference now to the drawing, there is shown a conventional electrical source 10 which is electrically connected to a control system 12, which may include a saturable core reactor control, a variable resistor or other current regulating device. The source 10 and the control 12 are coupled in circuit with an excitation field 14 of a main generator 16. The generator, in turn, provides an electric source 18 which is electrically coupled to non-revolving fields 20 and 22 of traction motors 24 and 26, respectively. The motors also include armatures 28 and 30 which are connected to an electrical dissipating load 32, such as a resistor. The motor armatures 28 and 30 are located in one electrically powered unit or locomotive, for example, and, in the case of a locomotive or other vehicle, are mechanically rotated as a function of the motion of the vehicle.

This well known arrangement provides for dynamic or electric braking since the electrical dissipating load 32 dissipates the power generated by the motors 24 and 26 operating as generators and being driven by the momentum of the moving vehicle or by the momentum of the movement of the armatures. The rotational speed of the armatures 28 and 30 will vary with the speed of the vehicle or other unit so that the electrical strength of the nonrevolving motor fields 20 and 22 must be varied in accordance with the desired degree of retarding effect desired and within the limitation of the electrical dissipating load 32. Thus, control of the condition (i.e., torque and speed) of the traction motors 24 and 26 and of the power generated thereby, the speed of the armatures and the braking effect of the motors is ultimately controlled by the main generator 16 and by the excitation of the field 14 thereof. If the excitation of the field 14 is increased by varying the excitation control means 12 to increase the current flow therethrough the output from the main generator which provides excitation current to the fields 20 and 22 is increased so that the speed of the traction motors and the armatures 28 and 30 is decreased. Conversely, a decrease in the current energization of the field 14 results in a decrease in the current energization of the fields 20 and 22 and an increase in the speed of the armatures 28 and 30.

Thus, each individual locomotive or other electrically powered unit exerts a maximum braking effort when the traction motors 24 and 26, for example, act as generators to provide a maximum braking current through the electrical dissipating load 32 without burning out or otherwise damaging the load. Each individual unit or locomotive may have different characteristics and this is especially true where the locomotives are provided by different manufacturers. As a result, the braking currents passing through the electrical dissipating load circuits for maximum braking effort may be quite different for each individual unit. It is the purpose of this invention to compensate for these differences in characteristics of the various units and to provide for the control, from a single location, of the braking for example, of a plurality of locomotives in a consist so that the same percentage of maximum braking effort is provided simultaneously by each unit.

A current sensing means 34 or isolated current sensing means, including a current sensing winding 36, is operatively coupled to sense the current passing through the armatures 28 and 30 of the traction motors. The current sensing means also includes a transductor core 40 and a secondary winding 38. The current sensing device winding 38 also includes an electrical energy source 44 connected in series which may or may not be rectified and which will cause a lower level transductor sensing current to vary through loading resistor 46 in direct proportion to the current through the armatures 28 and 30 of the traction motors.

Operatively associated with the current sensing arrangement is a current-to-voltage converter or means for providing a first voltage which is proportional to the current passing through the armatures 28 and 30. This voltage providing means includes an impedance, such as a resistor 46, coupled in circuit with the energy source 44 and with the secondary winding 38. A voltage is developed across the impedance 46 which is proportional to the current passing through the armatures 28 and 30. A second transformer 48 is connected in circuit with the impedance 46 and has a primary winding 50 coupled thereacross. The transformer also has a secondary winding 52 which, if a DC signal is desired, is coupled to rectifier means or full-wave rectifier 54 which acts to rectify the voltage output from the second transformer 48.

Coupled to the output of the rectifier 54 is a means for providing a second voltage of a selectable value and for controlling the ratio of the second voltage with respect to the currents through armatures 28 and 30. This ratio-controlling means includes a potentiometer or similar proportioning control device 56 which is adjustable to provide the second voltage or selectively adjustable proportioned response signal at tap 60 and wherein the adjustment of the potentiometer controls the ratio of the second voltage and the current through the armatures 28 and 30.

An overload protection device, such as Zener diode 58, is connected between the output 60 of the potentiometer and electrical common. In addition, a capacitor 62, for example, is placed in circuit with the Zener diode 58 and electrical common to filter and dampen the second voltage provided at the output 60 of potentiometer 56. An isolation diode 64 is coupled to the capacitor and a load member, such as resistor 66 is connected between the diode 64 and electrical common.

A comparator means 68, which may be any one of a number of well known voltage comparators such as a micropositioning relay, for example, is coupled in operative relationship with the potentiometer 56 and is also coupled to receive a control voltage at the input 70 from the control unit or locomotive. The comparator 68 senses the control signal and the feedback or output signal which appears across the impedance 66 simultaneously and modulates the output of the electrical source 10 as it appears across the winding 14 so that the current through the field windings 20 and 22 and ultimately through the armatures 28 and 30 is controlled. The comparator 68 is operatively connected to the previously mentioned current regulating or control device 12 which controls the current through the main generator excitation field 14 and which ultimately controls the current through the armatures 28 and 30 of the traction motors.

It should be clearly understood that this invention has application for various types of electrically powered units wherein it is desired to control the condition of a plurality of electric motors in a plurality of electrically powered units which are connected together for multiple unit operation and is in no way limited to use with vehicles or locomotives. In operation the control voltage at terminal 70 may originate from any type of electrically powered unit, but the description of the operation of the system will be with respect to a plurality of locomotives as an example only.

The control voltage appearing at terminal 70 originates from the controlling locomotive and a predetermined value of voltage at the terminal 70 corresponds to a predetermined percentage of maximum braking effort as applied to the controlling locomotive. As previously stated, the purpose of this invention is to provide the same percentage of maximum braking effort for each trailing locomotive in the consist with respect to the percentage of maximum braking effort which is applied at the controlling locomotive. Accordingly, when the controlling locomotive is braked to a predetermined percentage of its maximum braking effort the same predetermined percentage of maximum braking effort is obtained in the trailing locomotive by varying the current through the traction motor field windings 20 and 22 and ultimately through the armatures 28 and 30. Although only one trailing locomotive is discussed it should be understood that this invention is equally applicable for any number of trailing locomotives in a consist with a controlling locomotive. The FIGURE illustrates an arrangement for one trailing locomotive but the same arrangement could be used for each one of any number of trailing locomotives.

When braking of the trailing locomotive occurs the traction motors 24 and 26 act as generators. The traction motor armatures 28 and 30 are mechanically rotated as a function of the motion of the locomotive and are connected to the electrical dissipating load 32. Thus, the rotation of the armatures 28 and 30 generates a current which is dissipated in the load 32 and this produces a retarding effect on the motion of the vehicle. Because the rotational speed of the armatures 28 and 30 varies with the speed of the locomotive, the electrical current through the field windings 20 and 22 must be varied in accordance with the desired degree of retarding effect and within the limitation of the electrical dissipating load 32. As the trailing locomotive is braked in conjunction with the controlling locomotive the current sensing reactor 34, which for example may be a 1,000-1 ratio single cable current sensing reactor that produces a linear 0 to 1 a. signal in the secondary for a 0-1,000 a. signal in the cable passing through the primary, is coupled to the circuit including the armatures 28 and 30 so as to sense the current passing therethrough.

A current signal is generated in the secondary winding 38 of the transductor 34 and this current results in a varying voltage across the impedance or resistor 46. This voltage is proportional to the current which flows in the primary 36 of the transductor 34 and is also proportional to the armature current passing through armatures 28 and 30. The varying voltage across the impedance 46 is then passed through the second transformer 48, which for example may be a 1-5 step up transformer. The output from the secondary winding 52 of the transformer 48 is then rectified to direct current by the utilization of the full-wave rectification bridge 54. The output of the bridge then appears across potentiometer 56, which acts as a voltage divider circuit for varying the ratio of the voltage provided thereby at line 60 with respect to the braking current passing through armatures 28 and 30.

Thus, by adjusting the potentiometer 56 the system of this invention is capable of providing a predetermined voltage at the line 60 for a predetermined percentage of maximum braking current through the armatures 28 and 30. The potentiometer 56 can be adjusted and calibrated so that the voltage input therefrom to the comparator 68 is equal to the control voltage input at line 70 when the percent of maximum braking effort in the trailing locomotive is equal to that in the controlling locomotive.

For example, if the controlling locomotive is braked at 50 percent of its maximum braking effort a predetermined voltage will appear at the line 70. If the trailing locomotive is simultaneously braked at a percentage other than 50 percent of its maximum braking effort the comparator 68 will operate to adjust the current regulating member 12 in such a way as to change the excitation of the field winding 14. This, in turn, will result in a change in the excitation of the field windings 20 and 22 and will result in a change in the current flowing through the armatures 28 and 30. This change will effect the braking of the trailing locomotive as the energy is dissipated in the dissipating load 32. In addition, the braking current passing through the armatures 28 and 30 will be sensed by the reactor 36 and will ultimately be fed down to the potentiometer 56, which will provide the voltage input to the comparator 68. Because the potentiometer 56 can be calibrated or adjusted to provide an output voltage at 50 percent of the maximum braking effort of the trailing locomotive equal to the control voltage that exists at 50 percent of the maximum braking effort of the controlling locomotive, the comparator 68 will cease to adjust the current regulator 12 when the two voltage inputs to the comparator are equal. Thus, the trailing locomotive is automatically adjusted to simultaneously provide the same percentage of maximum braking effort as is provided by the controlling locomotive so that even braking of the consist occurs.

Although the invention has been specifically described with respect to locomotives and with respect to an arrangement of locomotives in a consist, the control system herein described is useful in many applications wherein it is desired to control the condition of a plurality of electric motors in a plurality of electrically powered units which are connected together for multiple unit operation.

Obviously many modifications and variations of the present invention are possible in light of the above teachings. It is therefore to be understood that within the scope of the appended claims the invention may be practiced otherwise than as specifically described.

What is claimed is:

1. A motor control system for controlling the speed and torque of one or more electric motors interconnected in a unit which system permits simultaneous and equal speed and torque control over a plurality of such units with a common control signal even though different ones of the units may have different electrical characteristics with respect to motor speeds and torques, said system comprising:

electrical source means connected to provide excitation current to the motors in said unit, excitation control means connected to said electrical source means for controlling said excitation current in response to an excitation control signal, current sensing means associated with the motors in said unit for providing a sensing electrical output in proportion to actual motor currents that vary according to the actual motor speed and torque conditions, a selectively adjustable proportioning control means connected to said current sensing means for providing a selectively adjustable proportioned response signal that represents a selectable predetermined proportion of said sensing electrical output, and comparator means effectively connected to said proportioning control means and said exitation control means for comparing said common control signal with said proportioned response signal to provide said exitation control signal when a predetermined difference exists therebetween for controlling the exitation current to the motors in said unit whereby when in a plurality of units, the said predetermined proportion of said sensing electrical output is selected to provide the same proportioned response signal levels versus motor speed and torque characteristics, the same common control signal may then be used to obtain simultaneous equal speed and torque control in said plurality of units.

2. A motor control system as in claim 1 further comprising electrical filtering means connected between said selectively adjustable proportioning control means and said comparator means for removing electrical transients from said proportioned response signal before comparison with the common control signal is effected.

3. A motor control system as in claim 1 wherein said current sensing means comprises:

transductor means inductively coupled rather than directly coupled to said motors to provide a relatively low level current electrically isolated from the actual motor currents but which low level current is substantially proportional to said actual motor currents, and current-to-voltage converter means for converting said low level current into a proportional voltage comprising said sensing electrical output.

4. A motor control system as in claim 3 wherein said current-to-voltage converter means comprises:

an electrical impedance in series with said low level current, a full-wave rectifier, and a transformer having a primary connected across said electrical impedance and a secondary connected to an input of said full-wave rectifier, the output of said full-wave rectifier providing said sensing electrical output.

5. A motor control system as in claim 1 wherein said selectively adjustable proportioning control means comprises a potentiometer.

6. A motor control system as in claim 1 used as a dynamic brake controlling system further comprising:

dynamic braking resistors connected to dissipate said actual motor currents.

7. A motor control system as in claim 6 wherein said electrical source means comprises a generator having an output circuit connected to provide exitation current to field windings of said motors in said unit and wherein said excitation control means is connected to control the generator output and hence said excitation current.

8. A motor control system as in claim 7 wherein said excitation control means is connected in series with field windings of said generator and another source of electrical energy.

9. A motor control system as in claim 7 wherein said dynamic braking resistors are connected in an armature circuit of said motors and said current sensing means comprises transductors inductively coupled to the resulting armature-braking resistors series circuit.

10. A system of a plurality of mechanically coupled units of one or more interconnected electric motors, each said unit including a motor control system as in claim 1 and wherein the selectively adjustable proportioning control means in each unit is adjusted to cause the said proportional response signals in each unit to have the same electrical characteristics versus unit motor speed and torque whereby one common control signal may be used to obtain simultaneous equal speed and torque control in said plurality of units.

11. A control system for controlling the condition of a plurality of electrical motors in a plurality of electrically powered units connected together for multiple unit operation, said control system comprising:

means operatively associated with predetermined ones of said motors for sensing currents through armatures of said predetermined motors;

means operatively associated with said current sensing means for providing a first voltage proportional to said armature current;

means in operative circuit relationship with said voltage providing means for providing a second voltage of a selectable value and for enabling the control of the ratio of said second voltage with respect to said armature current;

means for providing a control voltage; and means in operative relationship with said ratio controlling means and with said control voltage providing means for comparing said control voltage and said second voltage and for enabling the adjustment of the condition of said motors.

said current sensing means including a current sensing reactor operatively coupled to sense the currents through the armatures of said predetermined motors, said current sensing means further including:

a source of electrical energy; and a transformer having a primary winding thereof in circuit with said reactor and having a secondary winding in circuit with said energy source, said first voltage providing means including:

an impedance in circuit with said energy source and said secondary winding for developing a voltage proportional to said armature current;

a second transformer in circuit with said impedance; and rectifier means in circuit with said second transformer for rectifying the voltage output of said second transformer, and said ratio-controlling means including a potentiometer in circuit with said rectifier means, said potentiometer being adjustable to provide said second voltage and wherein adjustment of the potentiometer controls the ratio of said second voltage with respect to said armature current.

* * * * *